United States Patent
Nakamura et al.

(10) Patent No.: US 11,498,597 B2
(45) Date of Patent: Nov. 15, 2022

(54) VEHICLE COMMUNICATION SYSTEM

(71) Applicants: Kabushiki Kaisha Toshiba, Minato-ku (JP); Toshiba Infrastructure Systems & Solutions Corporation, Kawasaki (JP)

(72) Inventors: Kohta Nakamura, Musashino (JP); Yasuhiro Terakado, Yokohama (JP); Taichi Saguchi, Kawasaki (JP); Junichi Miyata, Setagaya (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 509 days.

(21) Appl. No.: 16/499,915

(22) PCT Filed: May 11, 2018

(86) PCT No.: PCT/JP2018/018418
§ 371 (c)(1),
(2) Date: Oct. 1, 2019

(87) PCT Pub. No.: WO2018/216515
PCT Pub. Date: Nov. 29, 2018

(65) Prior Publication Data
US 2020/0114941 A1 Apr. 16, 2020

(30) Foreign Application Priority Data
May 23, 2017 (JP) .............................. JP2017-101990

(51) Int. Cl.
*B61L 15/00* (2006.01)
*H04W 4/40* (2018.01)
*B61L 21/10* (2006.01)
*G07C 5/00* (2006.01)
(Continued)

(52) U.S. Cl.
CPC ....... *B61L 15/0027* (2013.01); *B61L 15/0054* (2013.01); *B61L 21/10* (2013.01);
(Continued)

(58) Field of Classification Search
CPC .. B61L 15/0027; B61L 27/70; B61L 15/0054; B61L 15/40; B61L 21/10;
(Continued)

(56) References Cited

U.S. PATENT DOCUMENTS

2011/0222426 A1 9/2011 Chazel et al.

FOREIGN PATENT DOCUMENTS

| CN | 106683472 A | 5/2017 |
|---|---|---|
| JP | 2006-264380 A | 10/2006 |

(Continued)

OTHER PUBLICATIONS

Extended European Search Report dated Feb. 1, 2021 in European Patent Application No. 18806203.8, citing documents AA and AX therein, 11 pages.
(Continued)

*Primary Examiner* — Michael J Zanelli
(74) *Attorney, Agent, or Firm* — Maier & Maier, PLLC

(57) ABSTRACT

A vehicle communication system includes a central device and an on-vehicle device. A path determiner of the central device determines an information transmission path between a plurality of vehicles for consolidating information in a vehicle that performs a wireless communication with a terrestrial communication device out of the vehicles based on at least operating information on the vehicles. An on-vehicle communicator of the on-vehicle device acquires the information transmission path directly from the central device via the terrestrial communication device or indirectly from the central device via the terrestrial communication device and a second vehicle, and transmits and receives
(Continued)

predetermined information to and from the terrestrial communication device or the second vehicle based on the acquired information transmission path.

7 Claims, 6 Drawing Sheets

(51) Int. Cl.
  *H04W 84/00* (2009.01)
  *B61L 27/70* (2022.01)
(52) U.S. Cl.
  CPC ............. *B61L 27/70* (2022.01); *G07C 5/008* (2013.01); *H04W 4/40* (2018.02); *H04W 84/005* (2013.01)
(58) Field of Classification Search
  CPC .......... B61L 27/20; B61L 3/12; G07C 5/008; H04W 84/005; H04W 40/026; H04W 40/22; H04W 40/02; H04W 4/40; H04W 40/18; H04W 40/20
  See application file for complete search history.

(56) References Cited

FOREIGN PATENT DOCUMENTS

| | | |
|---|---|---|
| JP | 2007-81542 A | 3/2007 |
| JP | 2010-12932 A | 1/2010 |
| JP | 2012-76582 A | 4/2012 |
| JP | 6071550 B2 | 2/2017 |
| KR | 10-1615970 B1 | 4/2016 |
| WO | WO-2011133016 A2 * | 10/2011 ............. G01C 21/34 |

OTHER PUBLICATIONS

Luobei Kuang, et al., "An Adaptive Routing Protocol for Bus Networks," 2010 24$^{th}$ International Conference on Advanced Information Networking and Applications, XP031682480, 2010, pp. 98-104.

International Search Report dated Jul. 10, 2018 in PCT/JP2018/018418 filed May 11, 2018.

* cited by examiner

| TYPE | | COMMUNICA-TION QUALITY | DATA AMOUNT |
|---|---|---|---|
| TRAIN CONTROL INFORMATION | FAILURE INFORMATION | HIGH | SMALL |
| SENSOR INFORMATION | POSITIONAL INFORMATION | MEDIUM | SMALL |
| | RECEPTION INTENSITY OF MOBILE PHONE RADIO WAVES | MEDIUM | SMALL |
| | STATE OF OVERHEAD LINES | MEDIUM | SMALL |
| | TEMPERATURE OF RAILS | MEDIUM | SMALL |
| VIDEO INFORMATION | SURVEILLANCE VIDEO | LOW | LARGE |
| | CONTENT (INCLUDING ADVERTISEMENT OR THE LIKE) | MEDIUM | MEDIUM |

FIG.4

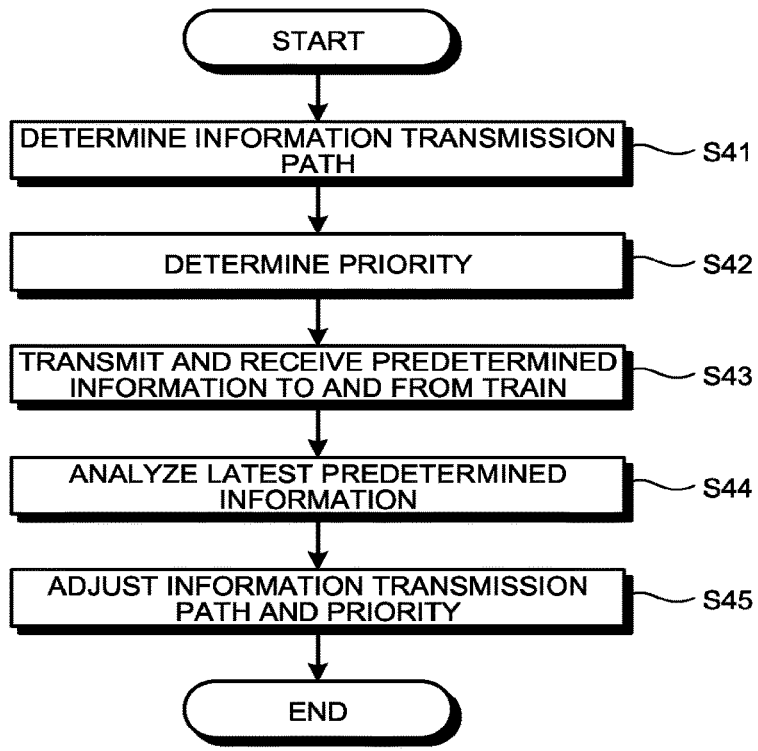

| TRAIN ID | RECEPTION INTENSITY OF MOBILE PHONE RADIO WAVES [dBm] | | |
|---|---|---|---|
| | AVERAGE | MINIMUM | MAXIMUM |
| 1 | -50 | -90 | -30 |
| 2 | -64 | -74 | -40 |
| 3 | -70 | -80 | -45 |
| 4 | -80 | -85 | -50 |

VEHICLE COMMUNICATION SYSTEM

CROSS-REFERENCE TO RELATED APPLICATIONS

This application is national stage application of International Application No. PCT/JP2018/018418, filed May 11, 2018, which designates the United States, incorporated herein by reference, and which claims the benefit of priority from Japanese Patent Application No. 2017-101990, filed May 23, 2017, the entire contents of each of which are incorporated herein by reference.

FIELD

Embodiments described herein relate generally to a vehicle communication system.

BACKGROUND

Conventionally, there have been known techniques for transmitting and receiving predetermined information between on-vehicle devices provided to trains when the trains are passing each other. In the conventional techniques, a central device may be provided as a ground-side device, and the entire system including the on-vehicle devices and the central device may share (transmit and receive) the predetermined information on the trains.

In the above-described system including the on-vehicle devices and the central device, the improvement of communication environment between the on-vehicle devices and the central device is required. For example, failure information on a train, which is one example of the predetermined information to be transmitted from the on-vehicle device to the central device, is important information. Consequently, it is required to quickly notify an operator of the central device of the failure information.

BRIEF DESCRIPTION OF DRAWINGS

FIG. 3 is an exemplary diagram of a specific example of properties of predetermined information that can be considered in the embodiment.

FIG. 4 is an exemplary flowchart of a schematic procedure of processing performed by the central device according to the embodiment.

FIG. 9 is an exemplary diagram of a specific example of a radio wave environment that can be considered in a modification of the embodiment.

DETAILED DESCRIPTION

In general, according to one embodiment, a vehicle communication system includes a central device and an on-vehicle device. The central device is connected to a terrestrial communication device capable of performing a wireless communication with an object present in a predetermined first communication available range. The on-vehicle device is provided to each of a plurality of vehicles running on a route connected to terrestrial equipment including the terrestrial communication device, and includes an on-vehicle communicator capable of performing a wireless communication with an object present in a predetermined second communication available range. The central device includes a path determiner and a central communicator. The path determiner is configured to determine an information transmission path between the vehicles for consolidating information in a vehicle that performs the wireless communication with the terrestrial communication device out of the vehicles based on at least operating information on the vehicles. The central communicator is configured to transmit and receive predetermined information including the information transmission path to and from a vehicle present in the first communication available range of the terrestrial communication device via the terrestrial communication device. The on-vehicle communicator is configured to acquire the information transmission path directly from the central device via the terrestrial communication device or indirectly from the central device via the terrestrial communication device and a second vehicle, and to transmit and receive the predetermined information to and from the terrestrial communication device or the second vehicle present in the second communication available range based on the acquired information transmission path.

Embodiment

An embodiment is described below with reference to the accompanying drawings. The configuration of the embodiment described below and effects and results (advantageous effects) provided by the configuration are given by way of example only and are not limited to the contents described below.

Figure 1:
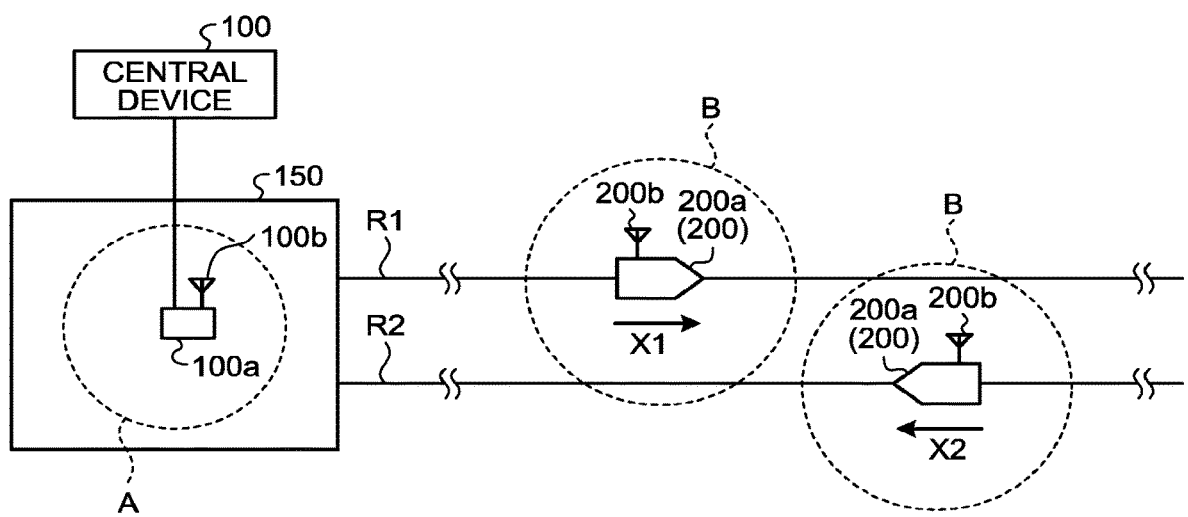
FIG. 1 is an exemplary diagram of a schematic configuration of a train communication system according to an embodiment.

FIG. 1 is an exemplary diagram of a schematic configuration of a train communication system according to an embodiment. As illustrated in FIG. 1, the train communication system according to the embodiment includes a central device 100 and on-vehicle devices 200. The central device 100 is connected to a terrestrial communication device 100a in terrestrial equipment 150 such as rail yards and stations. The on-vehicle devices 200 are provided to respective trains 200a that run on routes R1 and R2 connected to the terrestrial equipment 150.

The terrestrial communication device 100a includes an antenna 100b and is configured to be capable of performing wireless communications with an object present in a predetermined first communication available range A via the antenna 100b. The on-vehicle device 200 is configured to be capable of performing wireless communications with an object present in a predetermined second communication available range B via an antenna 200b provided to the train 200a.

While the number of routes connected to the terrestrial equipment 150 is two (routes R1 and R2) in FIG. 1, the number of routes according to the embodiment may be one or three or more. While FIG. 1 illustrates two different trains of the train 200a that runs in an X1 direction on the route R1 and the train 200a that runs (oppositely runs) in an X2 direction opposite to the X1 direction on the route R2, the two different trains according to the embodiment may run in the same direction.

In the above-described configuration, the improvement of communication environment between the trains 200a (on-vehicle devices 200) and the central device 100 is required in order to share information in the entire system including the on-vehicle devices 200 and the central device 100. For example, train control information, such as failure information on the train 200a, is important information. Consequently, it is required to quickly notify an operator of the central device 100 of the train control information.

Conventionally, there have been developed techniques for enabling quick transmission of predetermined information from the on-vehicle devices 200 to the central device 100 by providing, along the routes, a plurality of dedicated relay devices that relay communications between the on-vehicle devices 200 and the central device 100. The conventional techniques, however, require more time and effort in installing and operating the relay devices.

Therefore, as described below, the embodiment consolidates the pieces of predetermined information in the train 200a assumed to perform wireless communications with the terrestrial communication device 100a earliest by causing the trains 200a running on the routes R1 and R2 to perform inter-vehicle communications. Consequently, the embodiment quickly transmits the predetermined information to the central device 100 via the train 200a in which the pieces of predetermined information are consolidated.

Figure 2:
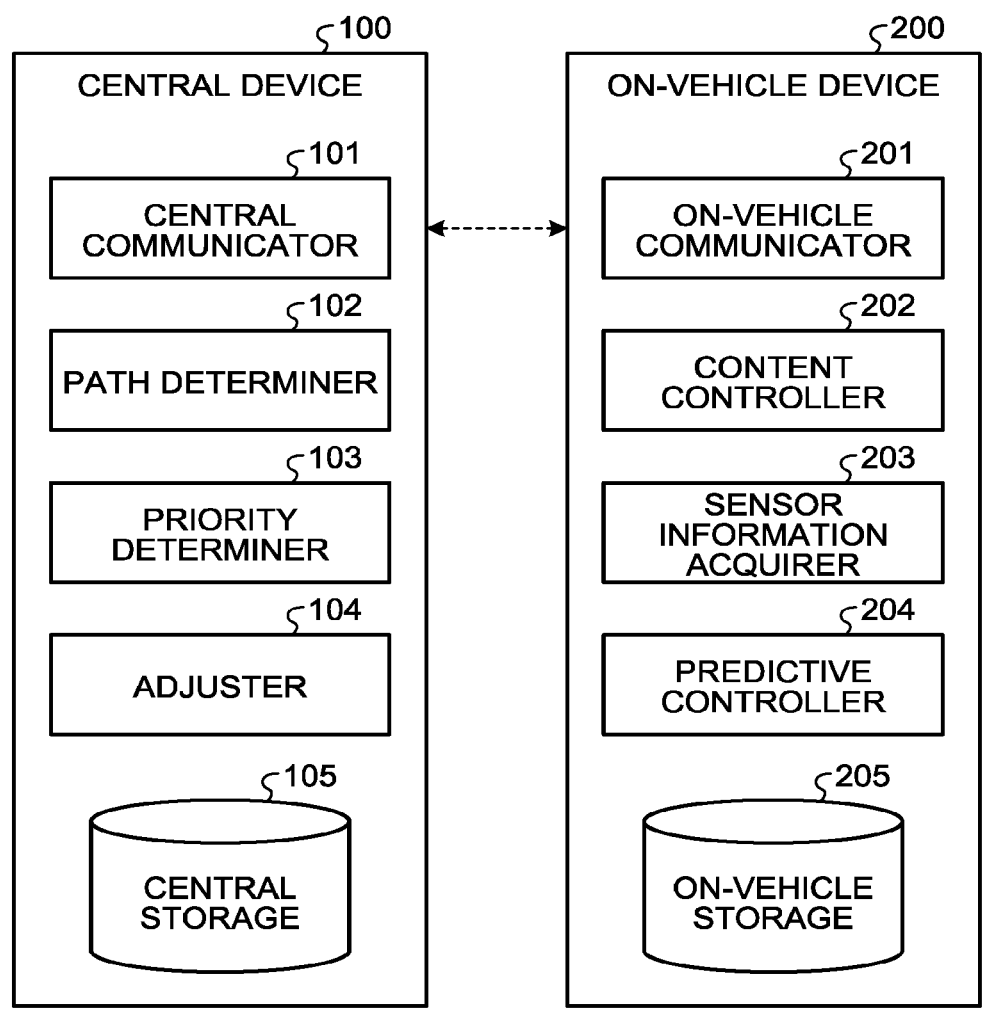
FIG. 2 is an exemplary block diagram of a schematic internal configuration of a central device and an on-vehicle device according to the embodiment.

FIG. 2 is an exemplary block diagram of a schematic internal configuration of the central device 100 and the on-vehicle device 200 according to the embodiment. As illustrated in FIG. 2, the central device 100 and the on-vehicle device 200 can perform interactive communications (wireless communications) (refer to the dotted arrow). As described above, the central device 100 performs wireless communications via the antenna 100b of the terrestrial communication device 100a, and the on-vehicle device 200 performs wireless communications via the antenna 200b of the train 200a. To simplify the explanation, FIG. 2 does not illustrate these hardware components for performing wireless communications.

As illustrated in FIG. 2, the central device 100 includes a central communicator 101, a path determiner 102, a priority determiner 103, an adjuster 104, and a central storage 105. The on-vehicle device 200 includes an on-vehicle communicator 201, a content controller 202, a sensor information acquirer 203, a predictive controller 204, and an on-vehicle storage 205. These components may be provided by cooperation of hardware (e.g., a processor, a memory, and the like) and software (a control program) like typical computers, or by only hardware such as a dedicated circuitry.

The central communicator 101 controls wireless communications via the antenna 100b of the terrestrial communication device 100a. The on-vehicle communicator 201 controls wireless communications via the antenna 200b of the train 200a. In the wireless communications according to the embodiment, data to be transmitted and received can be encoded by an encoding technique, and communication partners can be limited by an access control technique. The central storage 105 is a storage that stores therein the predetermined information transmitted and received by the central communicator 101. The on-vehicle storage 205 is a storage that stores therein the predetermined information transmitted and received by the on-vehicle communicator 201.

While details will be described later, in the embodiment, the predetermined information transmitted and received by wireless communications between the central communicator 101 and the on-vehicle communicator 201 and by wireless communications between the on-vehicle communicators 201 of the respective trains 200a includes: operating information (e.g., an operating schedule, a timetable, and the like) on the train 200a; train control information including failure information on the train 200a; sensor information; video information; and other information. The sensor information is data indicating the results of sensing performed by various kinds of sensors (not illustrated) provided to the train 200a. The video information is moving image data, such as a content (including an advertisement or the like) provided in the train 200a and video (surveillance video) taken by a surveillance camera provided to the train 200a.

The path determiner 102 determines an information transmission path between the trains 200a that runs on the route R1 and R2. The information transmission path enables consolidation of pieces of information in the train 200a that performs wireless communications with the terrestrial communication device 100a earliest. Determining the information transmission path requires at least operating information, such as the time at which the trains 200a arrive at the terrestrial equipment 150 provided with the terrestrial communication device 100a. Consequently, the path determiner 102 determines the information transmission path based on at least the operating information on the trains 200a.

In other words, the path determiner 102 according to the embodiment acquires the time at which the trains 200a each perform wireless communications with a second train 200a and the terrestrial communication device 100a based on the operating information. Based on the acquired time, the path determiner 102 determines the information transmission path. The on-vehicle communicator 201 acquires the information transmission path directly from the central device 100 via the terrestrial communication device 100a or indirectly from the central device 100 via the terrestrial communication device 100a and the second train 200a. Based on the acquired information transmission path, the on-vehicle communicator 201 transmits and receives the predetermined information to and from the terrestrial communication device 100a or the second train 200a. With this configuration, the embodiment can quickly transmit the predetermined information from the on-vehicle devices 200 to the central device 100 with no conventional relay devices described above that relay the communications between the on-vehicle devices 200 and the central device 100.

The embodiment preferably has higher efficiency and reliability in transmitting and receiving the predetermined information. Consequently, the embodiment determines the priority in transmitting and receiving the predetermined information, and transmits and receives the priority in a manner included in the predetermined information. The on-vehicle communicator 201 acquires the priority directly from the central device 100 via the terrestrial communication device 100a or indirectly from the central device 100 via the terrestrial communication device 100a and the second train 200a. Based on the acquired priority, the on-vehicle communicator 201 transmits and receives the predetermined information. With this configuration, the embodiment has higher efficiency and reliability in transmitting and receiving the predetermined information.

Let us assume a case where a certain train 200*a* is going to have a few opportunities to perform inter-vehicle communications, for example. The train 200*a* having a few opportunities need to transmit its own predetermined information to the second train 200*a* and receive the predetermined information on the second train 200*a* more reliably by increasing the number of times of transmitting and receiving the predetermined information. Therefore, the embodiment uses the number of times of transmitting and receiving the same information in an overlapping (redundant) manner in one wireless communication as an example of the priority as described below.

In other words, the priority determiner 103 according to the embodiment estimates, based on the operating information on the trains 200*a*, the number of second trains 200*a* that can be a communication partner until the on-vehicle communicator 201 of the on-vehicle device 200 of each of the trains 200*a* performs wireless communications with the terrestrial communication device 100*a*. The priority determiner 103 determines the propriety (number of times of transmission and reception) individually for each of the trains 200*a* such that a train 200*a* having a smaller number of second trains 200*a* that can be a communication partner has a larger number of times of transmission and reception.

As described above, the predetermined information according to the embodiment includes various kinds of information. These various kinds of information have different properties such as the communication quality suitable for transmission and reception and the data amount. Therefore, if all the pieces of information are transmitted and received by the same information transmission path and priority, the efficiency and the reliability in transmission and reception may possibly be reduced. To address this, the path determiner 102 and the priority determiner 103 according to the embodiment determine the information transmission path and the priority (number of times of transmission and reception), respectively, based on the properties of the predetermined information.

FIG. 3 is an exemplary diagram of a specific example of the properties of the predetermined information that can be considered in the embodiment. The priorities of the predetermined information according to the embodiment are stored in a table form as illustrated in FIG. 3. More specifically, a table 300 illustrated in FIG. 3 registers therein the communication quality suitable for transmitting and receiving the predetermined information and the data amount of the predetermined information for each type of the predetermined information as the properties of the predetermined information.

The failure information serving as the train control information, for example, needs to be transmitted and received with high communication quality because it is information indicating a significantly great possibility of an accident. Typically, the train control information has a small data amount. Consequently, the table 300 in FIG. 3 registers therein the communication quality and the data amount corresponding to the train control information as "high" and "small", respectively.

The sensor information includes the positional information on the train 200*a* acquired by the GPS, the reception intensity of mobile phone radio waves, the state of overhead lines, the temperature of rails, and the like, for example. Similarly to the train control information, the sensor information has a small data amount. The sensor information, however, need not be transmitted and received with communication quality as high as that of the train control information because the sensor information does not have the relationship to safety as high as that of the train control information. Consequently, the table 300 in FIG. 3 registers therein the communication quality and the data amount corresponding to the sensor information as "medium" and "small", respectively.

Surveillance video (video taken by a surveillance camera in the train 200*a*) serving as the video information described above has a significantly large data amount but is not very important. If the surveillance video is transmitted and received with low communication quality, no major problem occurs. Consequently, the table 300 in FIG. 3 registers therein the communication quality and the data amount corresponding to the surveillance video as "low" and "large", respectively. A content (including an advertisement or the like) serving as the video information described above has a smaller data amount than that of the surveillance video but is preferably transmitted and received with communication quality higher than that of the surveillance video. Consequently, the table 300 in FIG. 3 registers therein the communication quality and the data amount corresponding to the content as "medium" and "medium", respectively.

As described above, the pieces of predetermined information that can be transmitted and received in the embodiment have different properties, such as the communication quality, the data amount, and the like suitable for transmission and reception, corresponding to their types. To secure the efficiency and the reliability in transmitting and receiving all the pieces of predetermined information to some degree, the embodiment determines the information transmission path and the priority (number of times of transmission and reception) for each type of the predetermined information considering the information indicating the properties of the predetermined information indicated in the table 300.

Furthermore, the embodiment can acquire (calculate) the time length of wireless communications performed between each of the trains 200*a* and the second train 200*a* or the terrestrial communication device 100*a* from the operating information on the trains 200*a* included in the predetermined information. The embodiment may use the time length of wireless communications calculated from the operating information as one of the grounds for determining the information transmission path and the priority (number of times of transmission and reception) as described below.

If the time length of wireless communications is short, the amount of data capable of being transmitted and received is limited. Consequently, it is preferable that the predetermined information having high importance and a small data amount be transmitted preferentially. By contrast, if the time length of wireless communications is long, a sufficient amount of data can be transmitted and received. Consequently, not only the predetermined information having high importance and a small data amount but also the predetermined information having low importance and a large data amount can be transmitted and received.

In consideration of the circumstances described above, the path determiner 102 and the priority determiner 103 according to the embodiment may acquire the time length of wireless communications performed between each of the trains 200*a* and the second train 200*a* or the terrestrial communication device 100*a* based on the operating information. Then, the path determiner 102 and the priority determiner 103 may determine the information transmission path and the priority (number of times of transmission and reception), respectively, based on the acquired time length.

The embodiment, for example, may switch a plurality of patterns of the information transmission path and the priority (number of times of transmission and reception) based on whether the time length acquired from the operating information exceeds a threshold.

If the embodiment continuously uses the information transmission path and the priority (number of times of transmission and reception) once determined without any change, the embodiment may possibly fail to deal with a change in the situation and have lower efficiency and reliability in transmitting and receiving the predetermined information.

If the communication band that can be used by the on-vehicle communicator 201 is narrow for the data amount of the predetermined information to be transmitted and received, for example, the probability of success in transmitting and receiving the predetermined information is reduced. In this case, the embodiment preferably secures the efficiency and the reliability in transmitting and receiving the predetermined information by changing the information transmission path and by making the priority (number of times of transmission and reception) larger. Similarly, if the buffer size (storage capacity) that can be used to transmit and receive the predetermined information is small, the probability of success in transmitting and receiving the predetermined information is reduced. Also in this case, the embodiment preferably changes the information transmission path and makes the priority (number of times of transmission and reception) larger.

Referring back to FIG. 2, the central communicator 101 and the on-vehicle communicator 201 according to the embodiment transmit and receive parameters, such as the communication band and the buffer size, relating to transmission and reception of the predetermined information in a manner included in the predetermined information. The adjuster 104 analyzes the latest predetermined information acquired via the terrestrial communication device 100a and dynamically adjusts the information transmission path and the priority (number of times of transmission and reception) based on the analysis results. With this configuration, the embodiment can maintain the efficiency and the reliability in transmitting and receiving the predetermined information even if the situation changes.

The success rate of transmitting and receiving the predetermined information can be acquired by directly counting the number of times of success with respect to the number of times of transmission and reception. Consequently, the embodiment may include the success rate of transmitting and receiving the predetermined information in the object to be analyzed by the adjuster 104 by transmitting and receiving the success rate of transmitting and receiving the predetermined information in a manner included in the predetermined information.

The content that can be transmitted and received as the predetermined information according to the embodiment is preferably always the latest one. Consequently, the central communicator 101 and the on-vehicle communicator 201 according to the embodiment include a time stamp of the content in the predetermined information to be transmitted and received. The on-vehicle communicator 201 transmits and receives the content to and from the terrestrial communication device 100a or the second train 200a based on the time stamp such that the content provided in the train 200a provided with the on-vehicle communicator 201 becomes a later one. With this configuration, the latest content provided from the central device 100 is distributed to all the trains 200a via the terrestrial communication device 100a.

The content controller 202 according to the embodiment has a function of providing the content acquired (received) by the on-vehicle communicator 201 to the inside of the vehicle. The content controller 202, for example, controls a display device and a speech output device (neither of which is illustrated) provided to the train 200a, thereby providing the content to the inside of the vehicle.

The sensor information acquirer 203 according to the embodiment acquires the sensor information indicating the results of sensing performed by various kinds of sensors (not illustrated) provided to the train 200a. As described above, the sensor information includes various kinds of information, such as the positional information on the train 200a acquired by the GPS, the reception intensity of mobile phone radio waves, the state of overhead lines, the temperature of rails, and the like.

The sensor information, such as the positional information, the reception intensity of mobile phone radio waves, the state of overhead lines, the temperature of rails, and the like, indicates the surroundings of the train 200a. Consequently, the surroundings (e.g., weather) of the place where the sensor information is acquired can be assumed from the sensor information. If the temperature and the humidity of the overhead lines and the rails are acquired as the sensor information, for example, it can be assumed whether it is raining or snowing.

As described above, the embodiment transmits and receives the sensor information on the trains 200a between the trains 200a as part of the predetermined information. Accordingly, by making the assumption based on the sensor information as described above, the trains 200a can assume in advance the surroundings at the place where they are going to run and then run in a manner suitable for the surroundings.

The predictive controller 204 according to the embodiment assumes the surroundings at the place where the train 200a provided with the predictive controller 204 is going to run based on the sensor information acquired via wireless communications by the on-vehicle communicator 201. Then the predictive controller 204 predictively performs running control in response to the assumption results.

The sensor information according to the embodiment can include the results of sensing performed by a maintenance sensor for various kinds of devices provided in the train 200a, which is not described above. A sign of an abnormality (failure) of the corresponding device can be detected from the sensor information on the maintenance sensor. Consequently, the embodiment may employ the technique of determining whether a sign of a failure is detected based on the sensor information and transmitting and receiving, if a sign of a failure is determined to be detected by an event-driven system or the like, only the video information relating to the device having the sign of the failure as the predetermined information.

The following describes the procedure of the control operation according to the embodiment.

FIG. 4 is an exemplary flowchart of a schematic procedure of the processing performed by the central device 100 according to the embodiment.

At S41 illustrated in FIG. 4, the path determiner 102 according to the embodiment determines the information transmission path for efficiently and reliably transmitting and receiving the predetermined information between the central device 100 (terrestrial communication device 100a) and the on-vehicle device 200 (train 200a) and between the trains 200a. At S42, the priority determiner 103 determines the priority in transmitting and receiving the predetermined information. The matters to be considered in determining the information transmission path and the priority are not explained herein because they have been described above.

At S43, the central communicator 101 includes the information transmission path and the priority determined at S41 and S42 in the predetermined information and transmits and receives the predetermined information to and from the train 200a (on-vehicle device 200) present in the communication available range A of the terrestrial communication device 100a.

At S44, the adjuster 104 analyzes the latest predetermined information acquired at S43. At S45, the adjuster 104 then adjusts the information transmission path and the priority determined at S41 and S42 based on the analysis results acquired at S44. Subsequently, the processing is ended.

Figure 5:
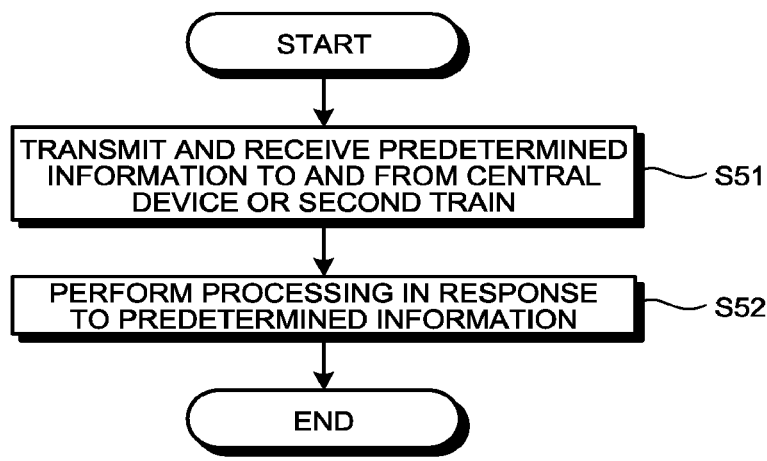
FIG. 5 is an exemplary flowchart of a schematic procedure of processing performed by the on-vehicle device according to the embodiment.

FIG. 5 is an exemplary flowchart of a schematic procedure of the processing performed by the on-vehicle device 200 according to the embodiment.

At S51 illustrated in FIG. 5, the central communicator 101 according to the embodiment transmits and receives the predetermined information to and from the central device 100 (terrestrial communication device 100a) or the second train 200a (on-vehicle device 200). To transmit and receive the predetermined information at S51, the information transmission path and the priority received most recently are used.

At S52, the on-vehicle device 200 then performs processing in response to the predetermined information acquired by transmission and reception at S51.

The processing described below is an example of the processing performed at S52.

Figure 6:
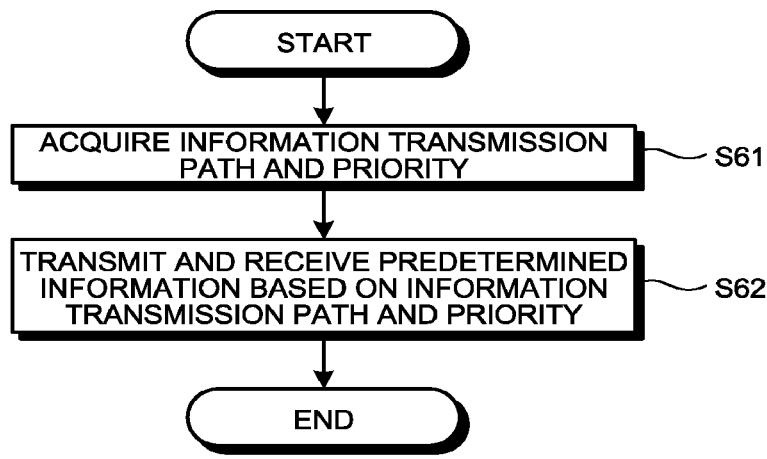
FIG. 6 is an exemplary flowchart of processing in response to the predetermined information performed by an on-vehicle communicator of the on-vehicle device according to the embodiment.

FIG. 6 is an exemplary flowchart of the processing in response to the predetermined information performed by the on-vehicle communicator 201 of the on-vehicle device 200 according to the embodiment.

At S61 in the processing procedure illustrated in FIG. 6, the on-vehicle communicator 201 acquires the information transmission path and the priority from the predetermined information transmitted and received at S51 in FIG. 5, for example.

At S62, the on-vehicle communicator 201 then transmits and receives the predetermined information possessed by itself based on the information transmission path and the priority acquired at S61. Subsequently, the processing is ended.

The processing described below is another example of the processing performed at S52 in FIG. 5, which is different from the processing illustrated in FIG. 6.

Figure 7:
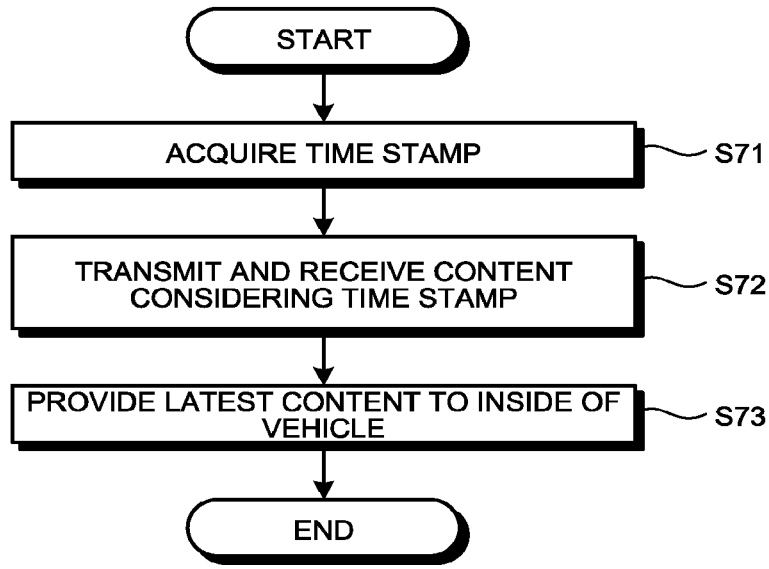
FIG. 7 is an exemplary flowchart of processing in response to the predetermined information performed by the on-vehicle communicator and a content controller of the on-vehicle device according to the embodiment.

FIG. 7 is an exemplary flowchart of the processing in response to the predetermined information performed by the on-vehicle communicator 201 and the content controller 202 of the on-vehicle device 200 according to the embodiment.

At S71 in the processing procedure illustrated in FIG. 7, the on-vehicle communicator 201 acquires the time stamp of the content from the predetermined information transmitted and received at S51 in FIG. 5, for example.

At S72, the on-vehicle communicator 201 then transmits and receives the content serving as one of the predetermined information considering the time stamp acquired at S71 such that the content possessed by itself and the communication partner is the latest one. If the content possessed by the on-vehicle communicator 201 is older than that possessed by the communication partner, for example, the on-vehicle communicator 201 receives the content from the communication partner, thereby updating the content possessed by itself. If the content possessed by the on-vehicle communicator 201 is newer than that possessed by the communication partner, the on-vehicle communicator 201 transmits the content to the communication partner, thereby causing the communication partner to update the content.

At S73, the content controller 202 then provides the latest content acquired as the result of S72 to the inside of the vehicle. Subsequently, the processing is ended.

The processing described below is still another example of the processing performed at S52 in FIG. 5, which is different from the processing illustrated in FIGS. 6 and 7.

Figure 8:
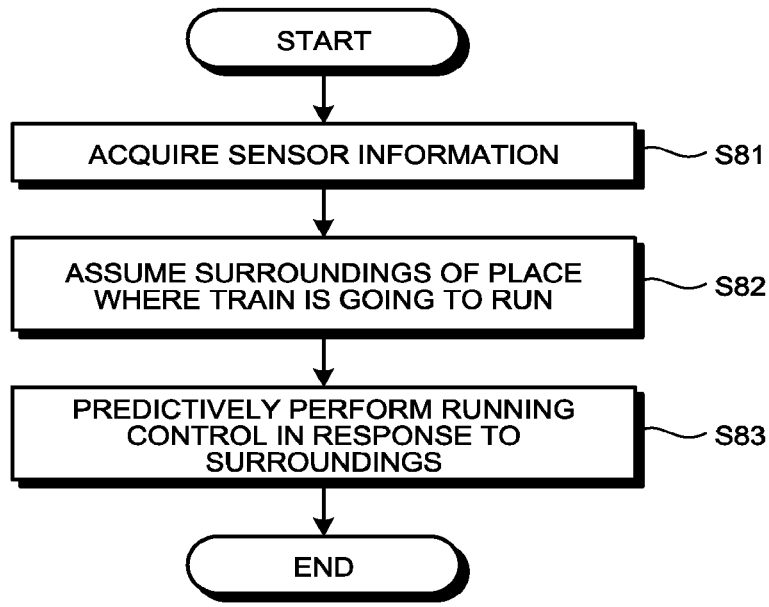
FIG. 8 is an exemplary flowchart of processing in response to the predetermined information performed by the on-vehicle communicator and a predictive controller of the on-vehicle device according to the embodiment.

FIG. 8 is an exemplary flowchart of the processing in response to the predetermined information performed by the on-vehicle communicator 201 and the predictive controller 204 of the on-vehicle device 200 according to the embodiment.

At S81 in the processing procedure illustrated in FIG. 8, the on-vehicle communicator 201 acquires the sensor information from the predetermined information transmitted and received at S51 in FIG. 5, for example.

At S82, the predictive controller 204 then assumes the surroundings of the place where the train 200a provided with the predictive controller 204 is going to run based on the sensor information acquired at S81.

At S83, the predictive controller 204 then predictively performs running control in response to the surroundings assumed at S82. Subsequently, the processing is ended.

As described above, the central device 100 according to the embodiment includes the path determiner 102. The path determiner 102 determines the information transmission path between a plurality of trains 200a for consolidating information in a train 200a that performs wireless communications with the terrestrial communication device 100a out of the trains 200a based on at least the operating information on the trains 200a. The on-vehicle communicator 201 of the on-vehicle device 200 acquires the information transmission path directly from the central device 100 via the terrestrial communication device 100a or indirectly from the central device 100 via the terrestrial communication device 100a and the second train 200a. Based on the acquired information transmission path, the on-vehicle communicator 201 transmits and receives the predetermined information to and from the terrestrial communication device 100a or the second train 200a. With this configuration, the embodiment can quickly transmit the predetermined information on the trains 200a to the central device 100 without providing any relay devices that relay the communications between the on-vehicle devices 200 and the central device 100 on the routes R1 and R2.

Modifications

The embodiment described above can quickly transmit information from the on-vehicle devices 200 to the central device 100 using a mobile communication network, such as a mobile phone network. If the on-vehicle devices 200 of all the trains 200a have the function of performing communications using the mobile communication network, however, the configuration is complicated, resulting in an increased cost. To use the mobile communication network, it is efficient that only the on-vehicle devices 200 of some specific trains 200a have the function of performing communications using the mobile communication network.

A modification that uses the mobile communication network (mobile phone communication network) preferably determines the information transmission path and the priority considering the quality of the communication environment (radio wave environment). The radio wave environment can be acquired as one of the sensor information, for example. In this modification, the radio wave environment in an on-rail area of a specific train 200a having the function of performing communications using the mobile communication network is stored in a table form as described below.

FIG. 9 is an exemplary diagram of a specific example of the radio wave environment that can be considered in the modification of the embodiment. A table 900 illustrated in FIG. 9 registers therein identification information (ID) on the specific train 200a having the function of performing communications using the mobile communication network (mobile phone communication network) and the radio wave environment in the on-rail area of the specific train 200a in a manner associated with each other. In the example illustrated in FIG. 9, three kinds of parameters, that is, the average value, the minimum value, and the maximum value of the reception intensity of mobile phone radio waves from a mobile phone base station are stored as the parameters indicating the radio wave environment.

The table 900 illustrated in FIG. 9 is updated as needed based on the latest predetermined information (sensor information). The central device 100 according to the modification uses the table 900 illustrated in FIG. 9, thereby determining the information transmission path and the priority considering the latest communication environment (radio wave environment) of the mobile communication network (mobile phone communication network).

According to the table 900 illustrated in FIG. 9, for example, the on-rail area of the train 200a having the train ID "1" has a maximum value of the reception intensity of mobile phone radio waves of "−30 dBm" and an average value of "−50 dBm". Consequently, the on-rail area of the train 200a having the train ID "1" is suitable to transmit and receive a large amount of data, such as the video information. The on-rail area of the train 200a having the train ID "1", however, is not suitable to transmit and receive data that requires continuous communications, such as the sensor information, because it has a minimum value of "−90 dBm". By contrast, the on-rail area of the train 200a having the train ID "3" has a maximum value of the reception intensity of mobile phone radio waves of "−45 dBm" and an average value of "−70 dBm". Consequently, the on-rail area of the train 200a having the train ID "3" is not as suitable as that of the train 200a having the train ID "1" to transmit and receive a large amount of data. The on-rail area of the train 200a having the train ID "3", however, is more suitable than that of the train 200a having the train ID "1" to transmit and receive data that requires continuous communications because it has a minimum value of "−80 dBm".

With the table 900 illustrated in FIG. 9, it can be determined which train 200a is suitable to transmit and receive which predetermined information. Consequently, the modification determines the information transmission path and the priority indicating which predetermined information is to be preferentially consolidated in which train 200a by considering the communication environment (radio wave environment) of the mobile communication network (mobile phone communication network) using the table 900 illustrated in FIG. 9, for example. Therefore, similarly to the embodiment described above, the modification using the mobile communication network can efficiently and reliably transfer the predetermined information on the trains 200a to the central device 100.

The embodiment described above may use a non-directional antenna or a directional antenna as the antenna of the train. With the latter antenna having directivity, the embodiment can improve the reliability in transmitting and receiving data by appropriately adjusting the directivity of the antennas of two trains when they are passing each other, for example. Therefore, the on-vehicle device according to the embodiment described above may include an antenna controller that controls (as software) the directivity of the antenna of the train provided with the on-vehicle device. To adjust the directivity, the embodiment considers information, such as the time at which the trains pass each other, the speed (acceleration) of the trains when they are passing each other, the period of time while the trains are passing each other, the distance between the trains passing each other (distance between the rails), and the like.

By acquiring wind pressure information and electrical signals and vibration information transmitted from the second train (e.g., a train in the opposite lane) via the rails, for example, the embodiment described above can calculate the time to perform wireless communications with the second train (time to come sufficiently close to the second train to perform wireless communications) from these pieces of information. Consequently, the embodiment may include the wind pressure information, the electrical signals, and the vibration information in the sensor information. With this configuration, the embodiment may calculate the time to perform wireless communications with the second train 200a using the sensor information as a supplementary of the operating information.

In the description above, the technique according to the embodiment is applied to the trains. The technique according to the embodiment is also applicable to buses and other means of transportation (vehicles) having an operating schedule determined in advance. Furthermore, the technique according to the embodiment is also applicable to an information sharing system between different means of transportation, such as between trains and busses.

The embodiment described above may be applied to trains provided with a storage battery and include information on energy consumption in the predetermined information. Examples the information on energy consumption include, but are not limited to, the residual quantity of the storage battery, the used quantity of the storage battery, the state of charge (SOC), the capacity (e.g., rated capacity and discharge capacity) of the storage battery, the type (properties) of the storage battery, the state of health (SOH) indicating a degraded state of the storage battery, information on an abnormality of the storage battery, information on the temperature (humidity) of the storage battery, the number of times of charge and discharge of the storage battery, the discharged quantity of the storage battery, the number of cycles of the storage battery, the depth of discharge (DOD) indicating the depth of discharge of the storage battery, the life (remaining available time, longevity, and durability) of the storage battery, vibration information on the storage battery, the size of the storage battery, the energy density of the storage battery, the energy efficiency of the storage battery, the state of function (SOF) indicating the power supply and reception capacity, etc.

By using the information on energy consumption described above, the embodiment can use the electric power efficiently in the entire railway system including the electric power system, leading to reduced load on the environment (energy saving). Let us assume a case where the storage battery is charged by contactless power supply while the train is stopped at a station, for example. In this case, by using the information described above, the embodiment can save energy in the entire railway system considering various parameters, such as a stoppage time (charge available time), a time until the train is stopped at the next station (time until the next charge available time), a discharge time, a regeneration time, and the like. Furthermore, the embodiment can preferentially charge a storage battery of a train having a less residual amount of charge considering a charge available capacity of a charging stand and availability of the charging stand including the residual amount of charge, for example.

While the embodiment and the modification thereof according to the present invention have been described, the embodiment and the modification thereof are given by way of example only and are not intended to limit the scope of the invention. The novel embodiment and the modification thereof may be embodied in a variety of forms, and various omissions, substitutions, and changes may be made without departing from the spirit of the invention. The embodiment and the modification thereof fall within the scope and the spirit of the invention and within the invention described in the accompanying claims and its equivalents.

The invention claimed is:

1. A vehicle communication system comprising:
a central device that is connected to a terrestrial communication device capable of performing a wireless communication in a predetermined first communication available range; and
an on-vehicle device that is provided to each of a plurality of vehicles running on a route physically connected to terrestrial equipment including the terrestrial communication device, the on-vehicle device including an on-vehicle communicator capable of performing a wireless communication in a predetermined second communication available range, wherein
the central device comprises:
a path determiner that is configured to determine an information transmission path between the vehicles for consolidating information in a vehicle that performs the wireless communication with the terrestrial communication device out of the vehicles based on at least operating information on the vehicles; and
a central communicator that is configured to transmit and receive predetermined information including the information transmission path to and from a vehicle present in the first communication available range of the terrestrial communication device via the terrestrial communication device, and
the on-vehicle communicator is configured:
to acquire the information transmission path directly from the central device via the terrestrial communication device or indirectly from the central device via the terrestrial communication device and a second vehicle; and
to transmit and receive the predetermined information to and from the terrestrial communication device or the second vehicle present in the second communication available range based on the acquired information transmission path.

2. The vehicle communication system according to claim 1, wherein
the central device further comprises
a priority determiner that is configured to determine priority in transmitting and receiving the predetermined information,
the predetermined information includes the priority, and
the on-vehicle communicator is configured:
to acquire the priority directly from the central device via the terrestrial communication device or indirectly from the central device via the terrestrial communication device and the second vehicle; and
to transmit and receive the predetermined information based on the acquired priority.

3. The vehicle communication system according to claim 2, wherein
the priority includes number of times of transmitting and receiving the same information in an overlapping manner in one wireless communication, and
the priority determiner is configured:
to estimate number of the second vehicles capable of being a communication partner until the on-vehicle communicator of each of the vehicles performs the wireless communication with the terrestrial communication device based on the operating information; and
to determine the number of times of transmission and reception for each of the vehicles such that the number of times of transmission and reception is larger as the number of the second vehicles is smaller.

4. The vehicle communication system according to claim 2, wherein
the path determiner is configured to determine the information transmission path based on a property of the predetermined information, and
the priority determiner is configured to determine the priority based on a property of the predetermined information.

5. The vehicle communication system according to claim 2, wherein
the path determiner is configured to acquire a length of a time in which each of the vehicles performs the wireless communication with the second vehicle and the terrestrial communication device based on the operating information and to determine the information transmission path based on the acquired length of the time, and
the priority determiner is configured to acquire the length of the time in which each of the vehicles performs the wireless communication with the second vehicle and the terrestrial communication device based on the operating information and to determine the priority based on the acquired length of the time.

6. The vehicle communication system according to claim 2, wherein
the central device further comprises
an adjuster that is configured to analyze the latest predetermined information acquired via the terrestrial communication device, and to dynamically adjust the information transmission path and the priority based on an analysis result.

7. The vehicle communication system according to claim 1, wherein
the predetermined information includes a content provided in the vehicles and a time stamp of the content, and
the on-vehicle communicator is configured to transmit and receive the content to and from the terrestrial communication device or the second vehicle based on the time stamp such that the content provided in the vehicle provided with the on-vehicle communicator is a later content.

* * * * *